July 15, 1958

R. LUCIEN 2,843,396

LIQUID-PNEUMATIC SPRING SYSTEM

Filed May 26, 1954

July 15, 1958 — R. LUCIEN — 2,843,396
LIQUID-PNEUMATIC SPRING SYSTEM
Filed May 26, 1954 — 3 Sheets-Sheet 2
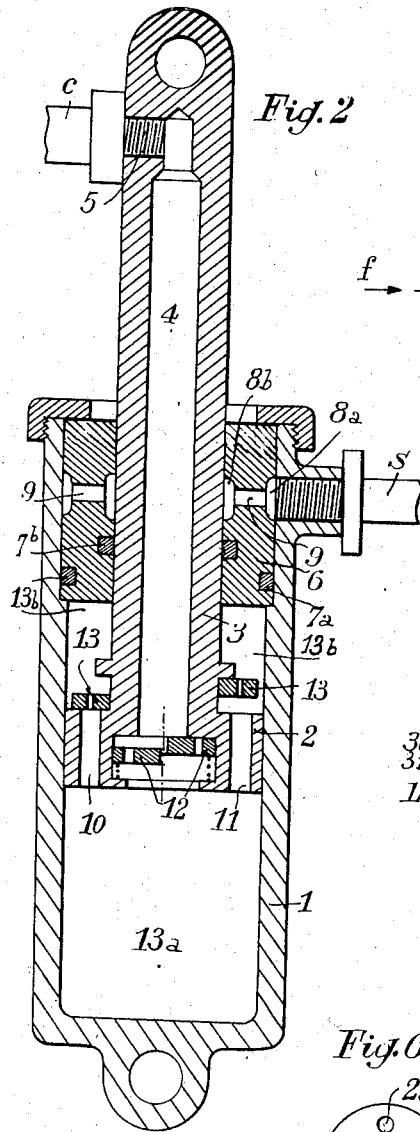
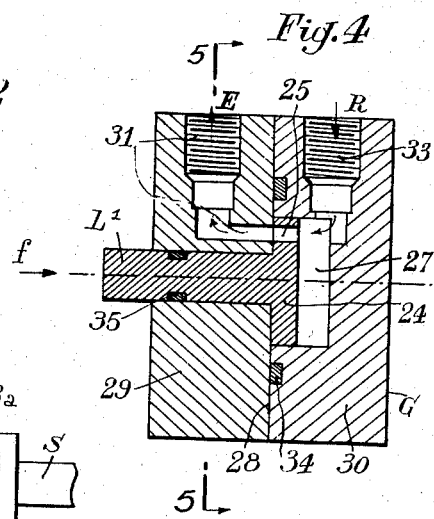
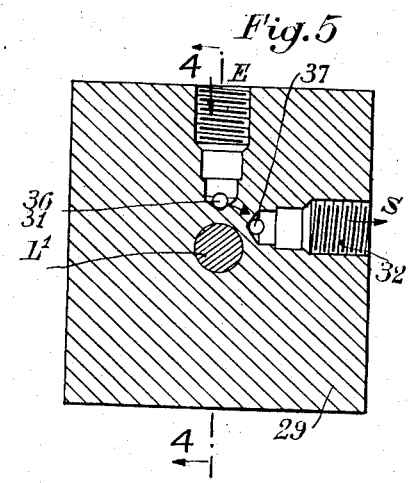
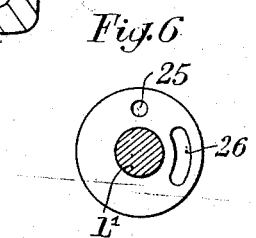
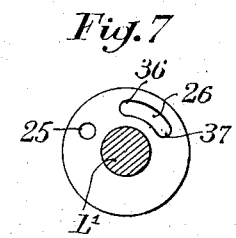

July 15, 1958

R. LUCIEN 2,843,396

LIQUID-PNEUMATIC SPRING SYSTEM

Filed May 26, 1954

United States Patent Office 2,843,396
Patented July 15, 1958

2,843,396

LIQUID-PNEUMATIC SPRING SYSTEM

René Lucien, Paris, France, assignor to Societe d'Inventions Aeronautiques et Mecaniques S. I. A. M., Fribourg, Switzerland, a corporation of Switzerland Application May 26, 1954, Serial No. 432,578

Claims priority, application France December 18, 1953

11 Claims. (Cl. 280—124)

This invention relates to liquid-pneumatic spring systems for vehicles and the like.

It is an object of the invention to provide an improved liquid-pneumatic spring system in which mechanical rolling-prevention means are combined with pneumatic cushioning means.

It is a further object of the invention to provide an improved system in which a transverse vehicle balance is obtained in accordance with the action of rolling-prevention means.

It is still another object of the invention to provide for maintaining a vehicle in fixed attitude relative to the ground and independently of the vehicle load.

To achieve the above and other objects, the invention contemplates the provision of a liquid-pneumatic system including a fluid pump operatively associated with fluid shock absorbers and accumulators and controlled by a distributor actuated in accordance with a change in load.

As one feature of the invention provision is made for the operation of the shock absorbers to effect a control over the accumulators to provide an improved cushioning effect.

A further feature of the invention is to provide a liquid recovery system to maintain, at all times, an economic operation at peak efficiency.

Moreover, the invention is concerned with providing a study system which can be manufactured at low costs.

Reference is next made to the accompanying drawing illustrating a preferred embodiment of the invention and in which:

Figure 2 is an axial sectional view of a hydraulic shock absorber used in my spring gear.

Figure 4 is a sectional view of a rotary valve taken on line 4—4 in Fig. 5.

Figure 5 is a sectional view of the valve taken on line 5—5 in Fig. 4.

Figs. 6 and 7 correspond respectively to Figs. 4 and 5 and show two positions of the valve casing as viewed in the direction of the arrow $f$ in Fig. 4.

Figure 8:
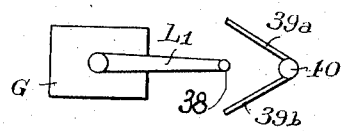
Figure 9:
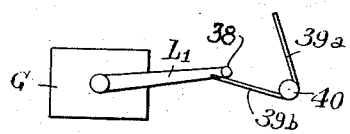

Figures 8 and 9 diagrammatically show the actuation of the valve.

Figure 10:
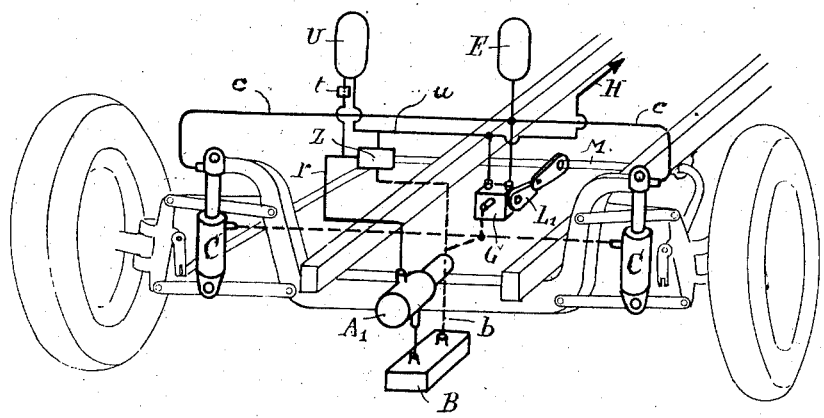

Figure 10 illustrates a modification for use where liquid under pressure is supplied by a constant-feed pump.

Figure 1:
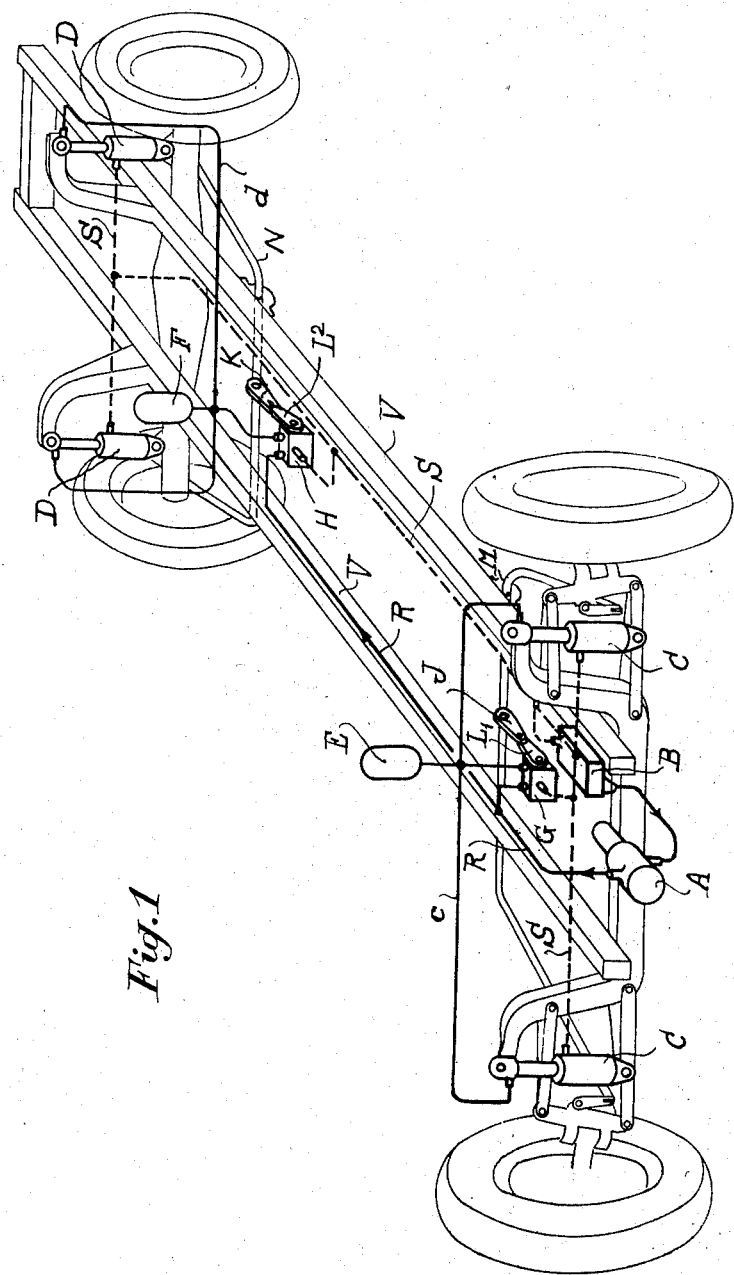
Figure 1 is a diagrammatical general view of liquid-pneumatic spring system according to my invention.

Reference will next be made to Fig. 1 in which supply circuits are represented in full lines and loss recovery circuits are drawn in dotted lines.

An oil-and-air spring system is mounted on side frames V—V and includes a pump A with a tank B supplying the whole system, front and rear hydraulic shock absorbers C—C and D—D, the shock absorbers in each pair being interconnected by lines $c$ and $d$ respectively, a pair of accumulators E—F connected respectively to lines $c$ and $d$, and a pair of valves G—H respectively connected to the accumulators E and F and to the discharge circuit R of the pump A as well as to the loss recovery circuit S which in turn is connected with the tank B. Said valves, as will be explained hereinafter, are actuated by means of forks J and K, respectively, which are mounted at the middle of anti-rolling shafts M—N which cooperate with the spring system in conventional manner.

The hydraulic shock absorbers C—C and D—D (see Fig. 2) each consists of a liquid-filled cylinder in which a piston is slidably received, the rod 3 of the piston being provided with an axial bore 4, the terminal orifice 5 of which communicates with the line $c$ or $d$ which in turn is connected with the related accumulator E or F. The piston rod projects through the cylinder cover and through a packing gland including packing rings 7a and 7b and stability is obtained by fitting the parts to one another with as little play as possible. It will be noted that the design removes whatever inconvenience might result from leaky packing rings since the losses are gathered within the packing glands in grooves 8a and 8b connected by channels 9 and are returned to the tank B through recovery pipes S. The oil which might remain within the grooves 8a—8b provides for the lubrication of the packing gland and consequently for a long life of the same.

Drilled in the piston are small holes 10 and 11 with which clack valves 12 and 13 cooperate to control the passage of the liquid. The valve 12 becomes effective during the compression stroke and the valve 13 during the release stroke. In Fig. 2, said valves are represented diagrammatically, one half of the valve structure being shown in action and the other half out of action. The valve 12 is preferably such as to obtain a control which is dependent on the speed of flow of the liquid.

During the compression stroke, the liquid present in chamber 13a is divided between chamber 13b and channel 4.

As set forth in the general description of the system and the operation of the same, the pressure in each cylinder is transmitted through pipe $c$ or $d$ to an accumulator E or F and conversely. This constitutes an important feature of my invention.

Figure 3:
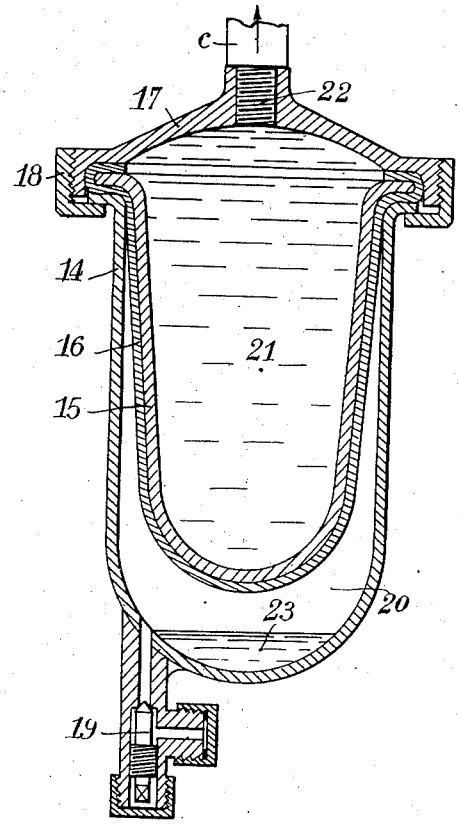
Figure 3 is an axial sectional view of an oil-and-air accumulator according to my invention.

Said accumulators (see Fig. 3) each consists primarily of a fluid-tight outer receptacle 14 in the shape of an inverted bell, within which a further similarly shaped receptacle 15 is enclosed. Receptacle 15 is made of porous sintered metal and is wrapped in a rubber pouch 16. The accumulator is closed by a cover 17 with the aid of a tightening ring screw 18.

The outer receptacle 14 is provided with a tail pipe closed by a valve 19 and through which air can be forced into the chamber 20 between the receptacle 14 and the pouch 16 to offset the weight of the vehicle while the space 21 within the inner receptacle is filled with oil and connected through an orifice 22 in the cover 17 with the pipes $c$ and $d$ leading to the shock absorbers. Present in the bottom of the outer receptacle 14 is a small amount of oil 23 the purpose of which is to adjust the amount of compressed air present in chamber 20. The porous receptacle 15 is pervious to the oil forced into chamber 21 during the compression strokes of the shock absorbers, whereby the liquid will inflate the elastic pouch 16 and consequently increase the pressure of the air present in chamber 20.

The rotary valve G or H (see Fig. 1) which is shown diagrammatically in Figs. 4 to 7 provides a further feature of my invention.

As explained in the general description of the system and the operation of the same, the valve is actuated with the aid of a lever $L_1$ or $L_2$ which in turn is actuated by means of either fork J or K.

Each lever ($L_1$ in Fig. 4) is rigid with a plug 24 provided with two orifices, of which one is a simple hole 25 extending through the whole plug while the other consists of an arcuate groove 26. The plug is rotatably received in a recess 27 and bears on a perfectly plane and smooth surface 28 along which a pair of blocks 29, 30 meet. Tapped in block 29 are a pair of sockets to be connected respectively with the accumulator E and the circuit S leading to the tank. Tapped in the block 30 is a further socket 33 to be connected with the discharge side R of pump A. Packings 34, 35 provide for fluid-tight communications as can be established within the valve by the angular displacement of the plug 24. With the plug set as shown in Figs. 4 and 6, the orifice 25 puts the sockets 31 and 33 and consequently the accumulator and the pump into communication with each other, the groove 26 then being closed. In the position of the plug shown in Figs. 5 and 7, the orifice 25 is closed by the block 29 while the ends 36 and 37 of the groove register respectively with the sockets 31 and 32, whereby the accumulator E is coupled with the circuit S leading to the tank B.

The actuation of the valves G and H is effected as follows (see Figs. 8 and 9). Each actuating lever, e. g. lever $L_1$ for the actuation of valve G, includes a pin 38 which normally is centrally located between the arms $39a$ and $39b$ of a fork rigidly connected at 40 with the middle of the related anti-rolling shaft M or N. The angle between the legs of the fork corresponds to the normal deflection of the wheel on a substantially level road. Thus, in normal operation (see Fig. 8) the levers will only be acted upon, and consequently the valves will only influence the spring gear, for deflections corresponding to non-permanent level changes.

As the vehicle is loaded while standing still, the underframe will sink relative to the ground; this will change the position of the fork relative to the lever as shown in Fig. 9. It follows that, as soon as the load is further increased, the lever will encounter the leg $39b$ and be swung upwards thereby. Consequently the plug of the valve assumes the position shown in Fig. 6 and a certain amount of pressure liquid is forced into the shock absorbers C and D. The result of such an inflow of liquid is to lift the pistons within the cylinders and to bring the fork progressively back to the mean position shown in Fig. 8. At that time, the leg $39a$ will act upon the lever in the reverse direction and bring it progressively back to its median position which corresponds to the closing of the valve (see Fig. 7) to connect the delivery side of the pump with the circuit S leading to the tank. It will be understood that the valves will act conversely under the influence of the forks following the unloading of the vehicle.

The pressure-generating pump A is assumed to be of variable capacity as shown in Fig. 1. The pump A automatically functions whenever one of the valves G or H connects it with either accumulator E or F. Optionally, such a pump may be combined with a small-capacity accumulator. It may also be replaced by a fixed-capacity pump, provided it is associated with a by-pass and an auxiliary buffer accumulator. Such a modification of my invention is illustrated diagrammatically in Fig. 10 of the drawing. As shown therein, the fixed-capacity pump $A_1$ forces liquid through a pipe $r$ provided with a non-return valve $t$ to the buffer accumulator U which, through pipe $u$ and with the aid of valves G and H, feeds the accumulators E and F. Branched to pipe $u$ is a by-pass Z the opposite end of which is connected to the delivery side $r$ of pump $A_1$ and to the tank through a pipe $b$.

Upon the pressure within pipe $u$ exceeding a predetermined value, the by-pass Z will open whereby the liquid forced by the pump is returned to the tank B through the pipe $b$.

Due to the presence of the non-return valve $t$ the buffer accumulator U is then cut off from the by-pass circuit. The by-pass will close as soon as the pressure within pipe $u$ falls to a definite value because of discharges at the valves; the pump $A_1$ will then once again discharge into the buffer accumulator U. The latter may be designed similar to accumulators E and F or be of any other suitable type.

I claim:

1. A hydropneumatic suspension system for vehicle wheels comprising a liquid pump, a supply circuit for liquid under pressure supplied from the pump, a return circuit, and a tank supplied from the return circuit and supplying the pump; for each transversely related pair of vehicle wheels, a pair of interconnected hydraulic shock absorbers and a connected hydropneumatic accumulator, a liquid distributor, and actuating means for the distributor responsive to a predetermined change of load on the suspended part of the vehicle, the distributor being connected respectively to the supply circuit, to the accumulator and to the return circuit and operative to connect the accumulator selectively to the supply circuit or to the tank; said shock absorbers each comprising a cylinder, a piston movable in the cylinder and having longitudinal passages extending therethrough, valve means operative to restrict the cross-section of the longitudinal passages upon outward movement of the piston in the cylinder, and a hollow open-ended piston rod communicating at one end with the accumulator and at the other end with the inside of the cylinder.

2. In a suspension system as in claim 1, said piston having an axial chamber through which the hollow piston rod communicates with the inside of the cylinder, and valve means operative to vary the cross-section of flow through the axial chamber according to whether the piston moves inwardly or outwardly in the cylinder.

3. In a suspension system as in claim 2, a packing gland surrounding the hollow piston rod and having internal and external grooves therein, facing respectively the external surface of the piston rod and the internal surface of the cylinder, and transverse passages connecting the internal and external grooves, and a port in the cylinder connecting the space defined therein by the external groove of the packing gland with the return circuit.

4. A suspension system as in claim 1 wherein the distributor comprises a casing having a plane internal surface, a disc slidable on the plane surface, a control shaft extending from the disc to rotate the latter, three ports opening into the casing and connected respectively to the supply circuit, to the accumulator and to the return circuit, the port connected to the supply circuit opening into the casing opposite the plane surface and the other two in the plane surface at an angle to each other with respect to the control shaft, a channel extending through the disc to establish, in one position thereof, a connection between the pump and the accumulator, and a curved groove in the disc facing the plane surface of the casing to establish, in another position of the disc at which the channel thereof is closed, a connection between the accumulator and the return circuit.

5. A suspension system as in claim 4 further comprising a lever extending from the control shaft, and a forked member having a tine extending on either side of the lever and mounted for movement relative to the distributor in opposite directions responsive to loading and unloading of the vehicle.

6. A suspension system as in claim 1 wherein the pump is of the variable delivery type.

7. A suspension system as in claim 1 wherein the pump is of the constant delivery type and further comprising a buffer accumulator having an inlet, an outlet, a by-pass connecting the inlet and outlet, and a non-return valve connecting the inlet to the supply circuit between the pump and the distributor, the by-pass being connected to the inlet between the non-return valve and the buffer accumulator to return excess fluid from the pump to the tank.

8. A hydraulic shock absorber comprising a cylinder, a piston movable in the cylinder and having passages therethrough, a piston rod connected to the piston and extending through one end of the cylinder, at said end of the cylinder a packing gland surrounding the piston rod; packing rings lodged in said packing gland and contacting on the one side said piston and on the opposite side said cylinder; in said packing gland, internal and external grooves and transverse passages connecting the grooves, and a port in the cylinder communicating with the space defined therein by the external groove of the packing gland.

9. In a hydropneumatic suspension system for vehicle wheels of the type comprising a supply source for liquid under pressure, a return circuit to a tank, a liquid distributor, hydraulic shock absorbers connected to each other and to a hydropneumatic accumulator, said shock absorbers each comprising a cylinder, a piston movable in the cylinder and having passages therethrough, a hollow piston rod connected to the piston and communicating at one end with the accumulator and at the other end with the chamber defined by the piston in the cylinder, a packing gland at the other end of the cylinder surrounding the piston rod and having internal and external liquid recovery grooves therein and transverse passages interconnecting the said grooves, and a port in the cylinder connecting the external groove of the packing gland with the return circuit to the tank.

10. In a suspension system as in claim 9, a rotary distributor defining a cavity having a plane surface, a disc in frictional contact with that surface, a control shaft fixed to the disc, three conduits opening into the said cavity and connected respectively to the pressure source, to the accumulator and to the return circuit, the first conduit being positioned on the side of the cavity remote from said surface and the other two opening into said surface, said conduits communicating with said cavity through ports angularly shifted with respect to said control shaft, said disc having a transverse passage therethrough constructed and arranged at one position of the disc to establish a communication between the pressure source and the accumulator and a circular groove opening toward said plane surface constructed and arranged to establish at another angular position of the disc whereat said transverse passage thereof is blocked, a communication between the accumulator and the return circuit.

11. In a suspension system as in claim 10, a lever extending from the control shaft, a finger connected to the lever, a fork having a branch extending on either side of the finger, a pivot mounting the fork for rotation in its plane, and means for moving the fork relative to the distributor in response to a variation in the vehicle load.

References Cited in the file of this patent

UNITED STATES PATENTS

| | | |
|---|---|---|
| 2,353,503 | Rost | July 11, 1944 |
| 2,371,553 | Scott | Mar. 13, 1945 |
| 2,490,311 | Rostu | Dec. 6, 1949 |
| 2,533,226 | Davis | Dec. 12, 1950 |
| 2,555,427 | Trautman | June 5, 1951 |
| 2,653,021 | Levy | Sept. 22, 1953 |